(12) United States Patent
Bristor

(10) Patent No.: US 7,278,662 B1
(45) Date of Patent: Oct. 9, 2007

(54) HOSE COUPLING DEVICE

(76) Inventor: Joe G. Bristor, 10605 SE. 240th St. #425, Kent, WA (US) 98031

( * ) Notice: Subject to any disclaimer, the term of this patent is extended or adjusted under 35 U.S.C. 154(b) by 0 days.

(21) Appl. No.: 11/119,976

(22) Filed: May 2, 2005

Related U.S. Application Data

(63) Continuation of application No. 10/389,895, filed on Mar. 17, 2003, now Pat. No. 6,908,122.

(51) Int. Cl.
*F16L 25/00* (2006.01)
(52) U.S. Cl. .......................................... 285/272; 285/7
(58) Field of Classification Search ................ 285/272, 285/281
See application file for complete search history.

(56) References Cited

U.S. PATENT DOCUMENTS

| | | | |
|---|---|---|---|
| 176,796 A | 5/1876 | Martin | 285/148.19 |
| 1,225,616 A * | 5/1917 | Gough | 285/281 |
| 1,264,736 A * | 4/1918 | Wilson | 285/281 |
| 1,300,365 A | 4/1919 | Fletcher | 285/333 |
| 1,450,126 A * | 3/1923 | Wilson | 285/281 |
| 1,947,909 A | 2/1934 | Hollander | 285/333 |
| 1,993,257 A | 3/1935 | Bettis | 285/333 |
| 2,107,716 A | 2/1938 | Singleton | 285/148.19 |
| 2,205,697 A | 6/1940 | Scharpenberg | 285/333 |
| 2,751,767 A * | 6/1956 | Hedden | 285/281 |
| 2,783,809 A | 3/1957 | Haines | 285/148.19 |
| 2,833,568 A * | 5/1958 | Corsette | 285/281 |
| 3,336,054 A | 8/1967 | Blount et al. | 285/333 |
| 4,205,866 A * | 6/1980 | McCracken | 285/281 |
| 4,625,998 A | 12/1986 | Draudt | 285/7 |
| 5,257,836 A | 11/1993 | Smith | 285/374 |
| 5,407,236 A | 4/1995 | Schwartz et al. | 285/23 |
| 6,070,912 A | 6/2000 | Latham | 285/148.19 |

* cited by examiner

*Primary Examiner*—Aaron Dunwoody

(57) ABSTRACT

A coupling device (1) for releasably connecting tubular elongate members (4, 5) with improved efficiency. The coupling device (1) comprises first and second end piece connectors (2, 3) which are threadably secured or otherwise attached to connection ends (6, 7) of first and second tubular elongate members (4, 5). First and second end piece connectors (2, 3) are connected by rotating each end piece connector (2, 3) a minimal amount relative to each other, such that the rotation simultaneously locks end piece connectors (2, 3) together and engages mating tapers (31, 32) thus sealing the two end piece connectors (2, 3) and creating a leak proof seal. Coupling device (1) is just as easily disengaged, by rotating the two end piece connectors (2, 3) each in the opposite direction from engagement. A similar coupling device (1') with all the same features as coupling device (1) plus a swivel feature is incorporated. In this way, the coupling device (1) and (1') provide a quick, easy and effective sealing mechanism especially useful to carpet cleaners who need to repeatedly connect and disconnect sections of vacuum hoses throughout their workday.

1 Claim, 4 Drawing Sheets

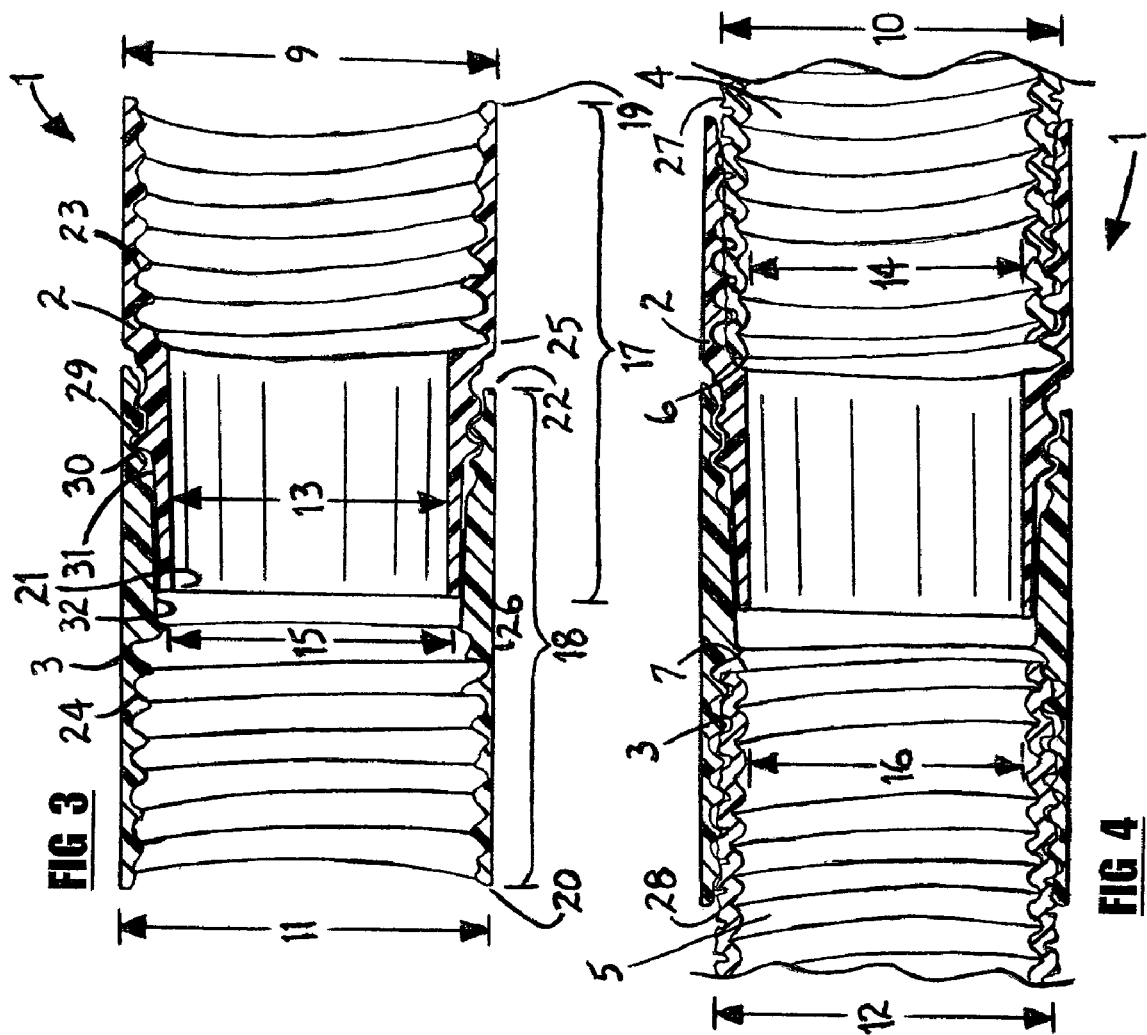

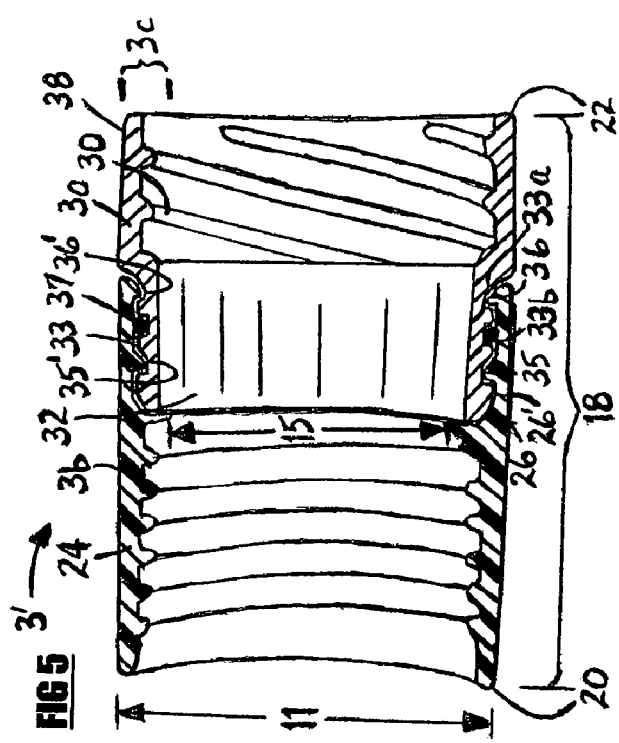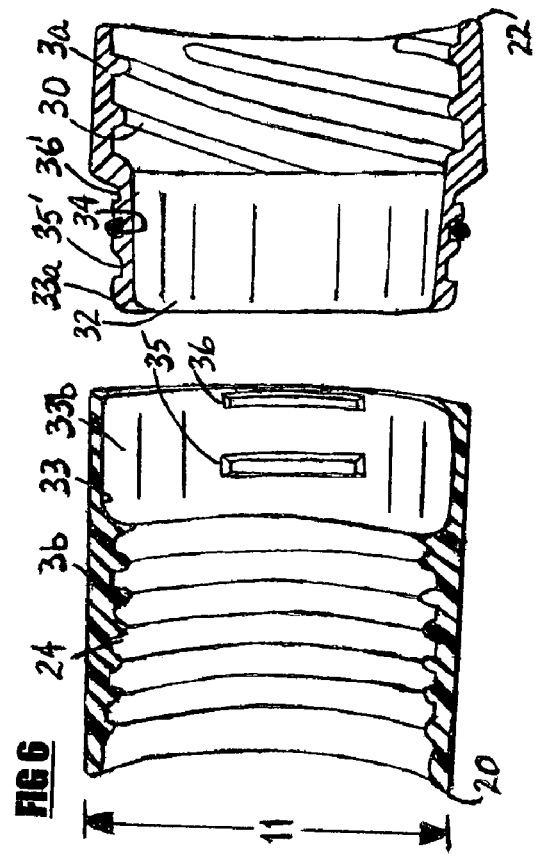

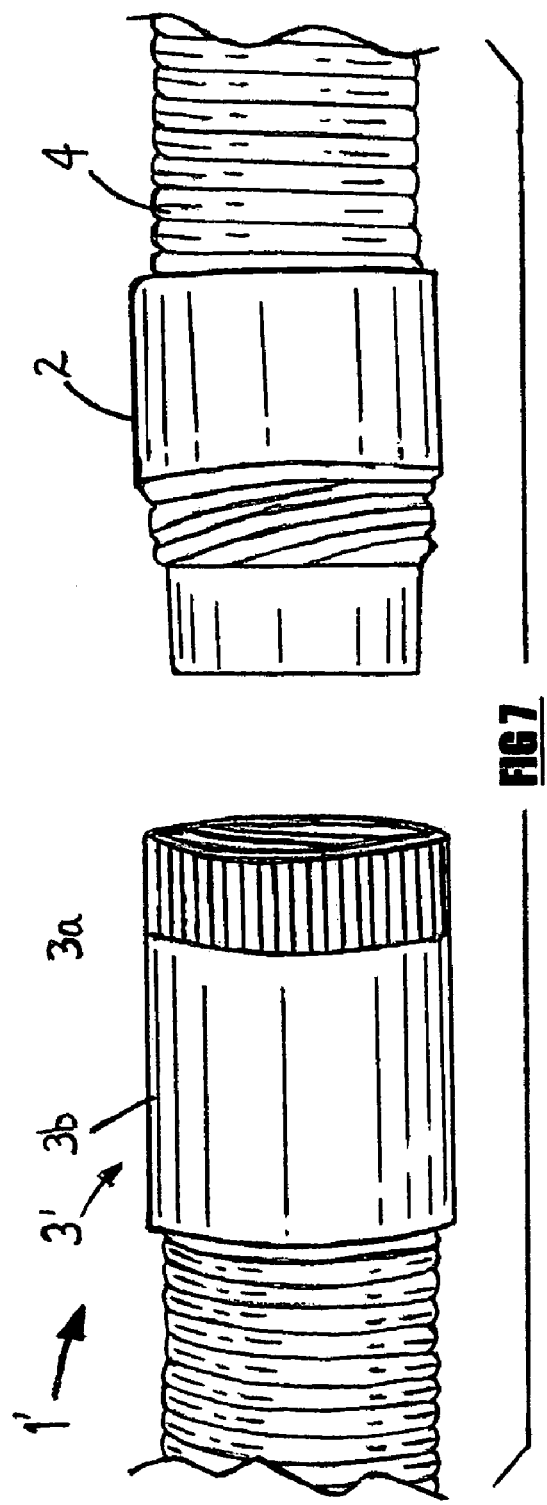
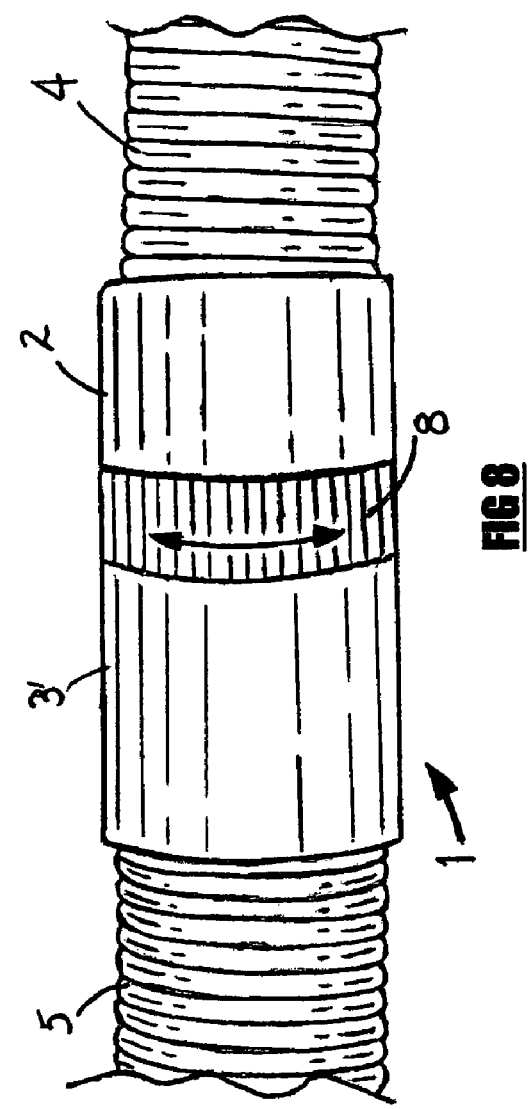

HOSE COUPLING DEVICE

CROSS REFERENCE TO RELATED APPLICATIONS

This is a continuation of application Ser. No. 10/389,895 filed Mar. 17, 2003 now U.S. Pat. No. 6,908,122, which is hereby incorporated by reference.

BACKGROUND OF THE INVENTION

1. Field of the Invention

This invention relates to hose couplers, and more particularly it relates to an improved vacuum hose coupling device.

2. Description of Prior Art

Various coupling devices are known in the art.

U.S. Pat. No. 4,625,998 to Donald A. Draudt (1986) discloses a swivel hose 'end piece connector' but there is no locking, sealing, or release mechanism provided in association with the connection of two hoses.

U.S. Pat. No. 5,257,836 to Peter J. Smith (1993) provides a quick and easy pipe coupling for field workers but it uses an 'elastomeric' sealing means of which are known in the art to degrade and leak over time, especially in the presence of water based chemicals commonly used in carpet cleaning.

U.S. Pat. No. 5,407,236 to Ernst Schwartz, et al. (1995) discloses an innovative hose coupling which could be modified for use by carpet cleaners but the coupling can only be disengaged with the aid of an auxiliary tool.

Coupling devices for releasably connecting sections of vacuum hose have evolved from single insert to multi-component types. The three most common coupling devices in use by carpet cleaners are:

The insert is 'wedged' into each hose end and the notches or barbs are meant to lock the coupler in place and thus hold the hoses together.

(2) Three-part coupler: two end piece connectors are each fixedly threaded onto each hose end, then an insert as described above is wedged into the free end of each end piece connector thus coupling the hoses.

(3) Four part coupler: the same two end piece connectors and insert are connected as described above, then a pair of straps straddle the coupling device and prevent it from being pulled apart.

There are numerous problems with these prior art couplings:

Single insert coupler: Vacuum hoses are typically made of hardened plastic with little elasticity and the insert is typically made of an even more rigid material; this makes for a physically trying experience wedging the insert into each hose end. During use, hot fluids and or air passing through the sections of hose cause differential swelling between the hose and insert. This swelling can result in leakage of air and or fluid around the hose end and insert. Eventually, this coupling device fails as the swelling becomes so extreme that the insert slips out of the hose end and may never seal properly again. Another problem with 'insert' couplings is that since the insert is of smaller inner diameter ("ID") than that of the hose itself, flow is restricted. Strands of hair and other debris accumulate at these restrictions over time and create a physical blockage in the hose. Aesthetically, the jagged hose detract from the appearance of this coupling device.

Three part coupler: The two end piece connectors hide the jagged hose ends and thus improve the appearance of the coupler. The two end pieces connectors provide a more secure attachment to the hose ends by means of threads along their interior surface whereby each end piece connector engages circumferential grooves along the perimeter surface of its respective hose end.

Unfortunately, the same 'insert' as described above is typically used to couple the two end pieces connectors and this weak connection allows this coupling device to pull apart under tension just like the single insert coupling device. Plus, the insert restricts flow and accumulates debris. Manufacturers seem to have added parts, expense, and complexity yet still have not solved the problems—flow restriction, leakage, and hose separation.

Four part coupler: This style of coupling device attempts to solve the 'separation' problem by using two straps that are secured to vacuum hose beyond the coupler itself then the two straps are buckled together. However, these straps add girth to the hose causing it to 'hang-up' on obstacles along its path. The straps collect debris that gets strewn through the area being vacuumed. The straps also add complexity, labor, parts, and expense. And the insert is still required, so leakage still occurs; especially as the hoses heat and swell with age.

With the advancements in the art, it seems that coupling devices have become:

(i) more complex in design, (ii) more difficult to use, (iii) more expensive, and (iv) less streamlined.

And they still haven't solved the two main functional problems of:

(v) leakage, and (vi) flow restriction.

BRIEF SUMMARY OF INVENTION

It is an object of the present invention to solve the above identified problems by providing a simpler and more functional coupling device. Accordingly, several objects and advantages of the invention are to disclose a coupler which is:

(i) simple in design, (ii) easy to use, (iii) inexpensive, and (iv) streamlined and attractive The proposed coupling device also solves the two main functional problems by providing:

(v) an effective sealing mechanism which won't swell or leak with age, and (vi) less flow restriction through the coupling device.

The proposed coupling device of the present invention goes further in providing, (vii) a releasable coupling device for vacuum hoses that also swivels, (viii) a vacuum hose connector that does not require the hoses to be rotated circumferentially during coupling and uncoupling, (ix) a vacuum hose connector that helps keep vacuum hoses from kinking.

A new and improved coupling device and method of engagement and disengagement is disclosed for coupling various tubular elongate members with improved efficiency.

BRIEF DESCRIPTION OF THE DRAWINGS

The present invention may be more readily described by reference to the accompanying drawings in which:

FIG. 3 is a cross-sectional view of the two end piece connectors coupled.

FIG. 4 is a cross-sectional view of the two hose ends coupled by means of coupling device.

FIG. 5 is a cross-sectional view of an alternate second end piece connector that swivels.

FIG. 6 is a cross-sectional view of the two parts of an alternate second end piece connector that swivels.

FIG. 7 is a perspective view of alternate swivel coupling device ready to connect two sections of hose.

FIG. 8 is a perspective view of two sections of hose coupled.

REFERENCE NUMERALS IN DRAWINGS

| Description | Numeral |
|---|---|
| Coupling device | 1 |
| Alternate coupling device | 1' |
| First end piece connector | 2 |
| Second end piece connector | 3 |
| Alternate second end piece connector | 3' |
| Swivel part of alternate second end piece connector | 3a |
| Connector part of alternate second end piece connector | 3b |
| Wall thickness of second end piece connector | 3c |
| First tubular elongate member | 4 |
| Second tubular elongate member | 5 |
| Connection end of first tubular elongate member | 6 |
| Connection end of second tubular elongate member | 7 |
| Arrow of rotation | 8 |
| OD of first end piece connector | 9 |
| OD of first tubular elongate member | 10 |
| OD of second end piece connector | 11 |
| OD of second tubular elongate member | 12 |
| ID of first end piece connector | 13 |
| ID of first tubular elongate member | 14 |
| ID of second end piece connector | 15 |
| ID of second tubular elongate member | 16 |
| Length of first end piece connector | 17 |
| Length of second end piece connector | 18 |
| First end of first end piece connector | 19 |
| First end of second end piece connector | 20 |
| Second end of first end piece connector | 21 |
| Second end of second end piece connector | 22 |
| End piece threads of first end piece connector | 23 |
| End piece threads of second end piece connector | 24 |
| Midpoint of first end piece connector | 25 |
| Midpoint of second end piece connector | 26 |
| Shifted Midpoint of second end piece connector | 26' |
| Circumferential grooves of first tubular elongate member | 27 |
| Circumferential grooves of second tubular elongate member | 28 |
| Coupling threads of first end piece connector | 29 |
| Coupling threads of second end piece connector | 30 |
| Tapered surface of first end piece connector | 31 |
| Tapered surface of second end piece connector | 32 |
| Dividing Line | 33 |
| First swivel & seal surface | 33a |
| Second swivel & seal surface | 33b |
| Channel | 34 |
| First Ridge on connector part of second end piece connector | 35 |
| First Notch on swivel part of second end piece connector | 35' |
| Second Ridge on connector part of second end piece connector | 36 |
| Second Notch on swivel part of second end piece connector | 36' |
| Elastomeric seal | 37 |
| Gripper surface | 38 |

DETAILED DESCRIPTION

Figure 1:
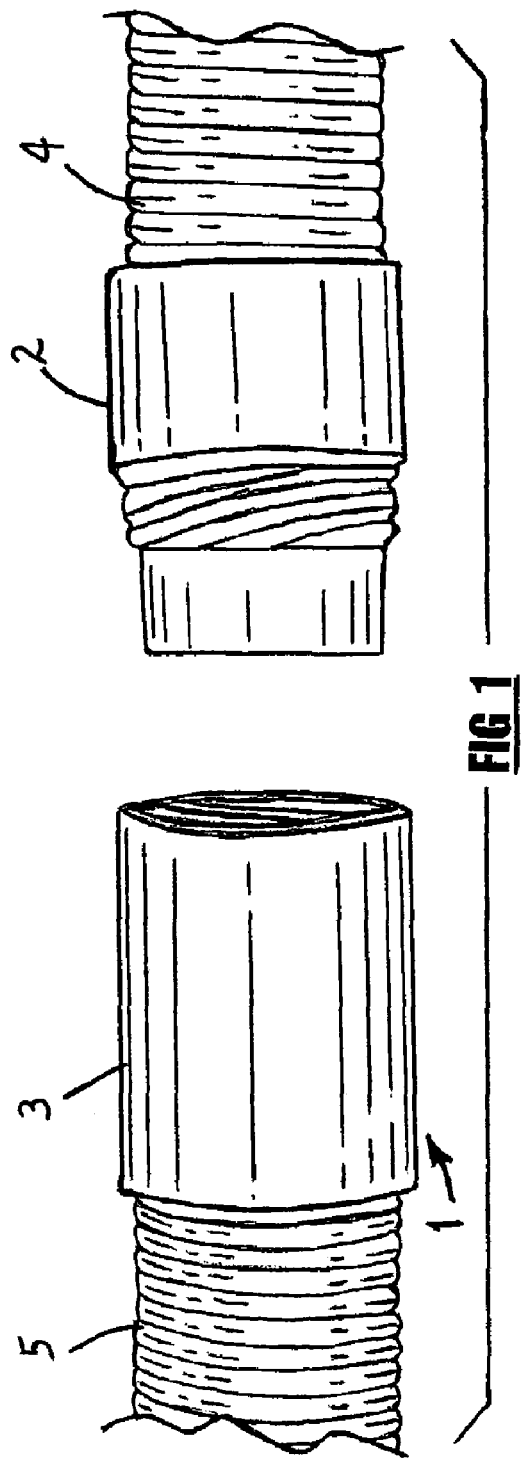
FIG. 1 is a perspective view of coupling device ready to connect two sections of hose.

FIG. 1 shows first and second end piece connectors 2, 3 having the general form of thick-walled sections of tubing threadably engaged to first and second tubular elongate members 4, 5 respectively.

Figure 2:
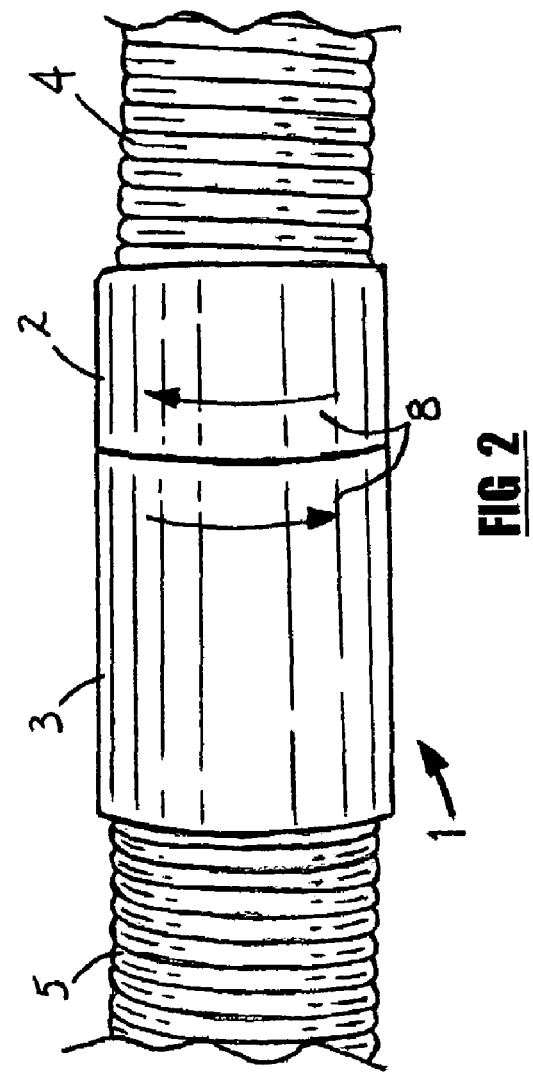
FIG. 2 is a perspective view of two sections of hose coupled.

FIG. 2 shows the first and second tubular elongate members 4, 5 coupled by means of the coupling device 1 of the present invention. This coupling is accomplished by means of a simple rotation of the two end piece connectors 2, 3 in the direction of the arrows 8; in the case of the preferred embodiment, clockwise.

FIG. 3 shows first and second end piece connectors 2, and 3 comprising outer diameters ("OD") 9 and 11, inner diameters ("ID") 13 and 15, lengths 17 and 18, first ends 19 and 20, and second ends 21 and 22, respectively.

In the preferred embodiment, end piece threads 23 and 24 line the interior surface of each end piece connector 2, 3 respectively and extend along the lengths 17, 18 of end piece connector 2, 3 respectively from their ends 19, 20 to their midpoints 25, 26, respectively.

Coupling threads 29, line the exterior surface of first end piece connector 2 and extend along the length 17 from about midpoint 25 to about three fourths of the distance from first end 19 to second end 21. Coupling threads 30 line the interior surface of second end piece connector 3 and extend along the length 18 from about three fourths of the distance from first end 20 to second end 22 to about the second end 22 of end piece connector 3. As shown in FIG. 3, coupling threads 29, 30 serve to lock end piece connector 2 and 3 together respectively, forming the coupled device 1 of the present invention.

Tapered surface 31 of first end piece connector 2, lines the exterior surface forming the approximate final quarter of the length 17, extending from about three fourths of the distance from first end 19 to second end 21 of end piece connector 2.

Tapered surface 32 of second end piece connector 3, lines the interior surface extending along the length 18 from about three fourths of the distance from first end 20 to second end 22 of end piece connector 3.

As shown in FIG. 3, tapers 31, 32 serve to seal end piece connector 2 against end piece connector 3 respectively as coupling threads 29, 30 of end piece connector 2, 3 are engaged, thus forming a leak proof seal for the coupling device 1 of the present invention.

Even with the coupling threads 29, 30 not completely threaded, FIG. 3 shows the seal along tapers 31, 32 to still be in effect.

FIG. 4 shows first and second tubular elongate members 4 and 5 having the general form of sections of vacuum hoses comprising connection ends 6 and 7, OD 10 and 12, ID 14 and 16, and circumferential grooves 27 and 28, respectively.

In the preferred embodiment, end piece threads 23, 24 (FIG. 3) of first and second end piece connectors 2, 3 respectively mate the circumferential grooves 27, 28 along the perimeter surfaces of respective first and second tubular elongate members 4, 5 and provide a secure engagement between respective first and second tubular elongate members 4, 5. Alternatively, the end piece threads 23 and 24 could be replaced with smooth walls sized to that of the OD of tubular elongate members 4, 5. This would allow end piece connectors 2, 3 to be fixedly glued to perimeter surface of each tubular elongate members 4, 5.

It can be seen that the narrowest of IDs 13, 15 of the coupling itself is not narrower than the IDs 14, 16 of the tubular elongate members 4, 5 themselves, thus there is no restriction of flow through the coupling device 1 of the present invention.

FIG. 5 shows an alternate embodiment second end piece connector 3' with an OD 11, ID 15, length 18, first end 20, second end 22, and wall thickness 3c.

The second end piece connector 3' is divided into two parts, a swivel part 3a and a connector part 3b. A dividing line 33 bisects the wall thickness 3c, the line extending along the length 18 from about the midpoint 26 of second end piece connector 3' to about three fourths of the distance from first end 20 to second end 22, the line running roughly parallel to the length of second end piece connector 3'. The space created by dividing line 33 creates two surfaces, a first swivel & seal surface 33a and a second swivel & seal surface 33b as described below. Elastomeric seal 37 in the preferred form of an o-ring, provides an airtight seal between surfaces 33a, 33b.

Swivel part 3a of second end piece connector 3' comprises a first swivel & seal surface 33a lining the outer circumference extending along the length 18 from about the midpoint 26 (or shifted midpoint 26') to about three quarters of the distance from first end 20 to about the second end 22, the surface modified to include circumferential notches 35' and 36' and a channel 34 sized to retain the elastomeric seal 37 like an o-ring and a gripper surface 38 lining the outer circumference extending along the length 18 from about three quarters of the distance from first end 20 to the second end 22, to the second end 22 and a coupling thread 30 lining the interior surface extending along the length 18 from about three fourths of the distance from first end 20 to second end 22 to about the second end 22 of second end piece connector 3' and a tapered surface 32 lining the interior surface extending along the length 18 from about midpoint 26 to about three fourths of the distance from first end 20 to second end 22 of second end piece connector 3' extending along the length 18 of end piece connector 3 from about midpoint 26 to about three fourths of the distance from first end 20 to second end 22.

FIG. 5 shows midpoint 26 shifted to new location 26' in the case where the manufactured length of second end piece connector 3' is lengthened to provide a longer gripper surface 38.

Connector part 3b of second end piece connector 3' comprises a second swivel & seal surface 33b lining the interior surface extending along the length 18 from about the midpoint 26 to about three quarters of the distance from first end 20 to the second end 22, the surface modified to include circumferential ridges 35 and 36 that interlock with notches 35' and 36' respectively of the swivel part 3a and end piece threads 24 lining the interior surface of connector part 3b extending along the length 18 from about the first end to the midpoint 26.

FIG. 6 shows the two parts of the second end piece connector 3', the swivel part 3a and the connector part 3b and the proposed surfaces of engagement of the first swivel & seal surface 33a to the second swivel & seal surface 33b. Ridges 35, 36 are protrusions on the interior surface of the second swivel & seal surface 33b. Ridges 35, 36 may form continuous bands or more preferably form parallel rib-like pairs spaced equidistantly along the circumference of inner surface as shown in FIG. 6. Ridges 35, 36 have a height of about one third the height of the wall thickness 3c and are spaced sufficiently to allow for channel 34. The sides of the ridges 35, 36 facing the first end of end piece connector 3' are somewhat vertical so as to better engage notches 35' and 36' respectively and help retain the swivel part 3a securely under tensional forces, yet not so restrictive as to hinder the tendency to swivel. The sides of the ridges 35, 36 facing the second end of end piece connector 3' are more gently sloped, beveled or broadened towards their bases so as to provide increased surface area during contraction, when vacuum is building and maximum seal is desired. Notches 35' and 36' are recesses in the exterior of swivel & seal surface 33a shaped to receive ridges 35, 36 respectively.

Assembly of the end piece connector 3' involves a simple process of installing the elastomeric seal 37 into the channel 34 then pressing the two parts swivel part 3a and connector part 3b together until the ridges 35 and 36 engage the corresponding notches 35' and 36' respectively. A lubricant may aid in engaging the parts without pinching or binding the o-ring.

Once assembled, the swivel and connector parts 3a and 3b respectively become one unit, an end piece connector 3' that swivels freely yet seals effectively. Alternate second end piece connector 3' still has similar strength and rigidity of that of the second end piece connector 2. The dual interlocking ridge and notch design provides a stable surface for sealing, one suitable for use with an elastomeric seal 37 of the one proposed.

FIG. 7 discloses the alternate embodiment of the coupling device 1' of the present invention comprising the first end piece connector 2, and the alternate second end piece connector 3' with its two parts, the swivel part 3a and the connector part 3b. The first and second end piece connectors 2, 3' mate first and second tubular elongate members 4, 5 respectively providing a secure swiveling engagement between respective first and second tubular elongate members 4, 5.

FIG. 8 shows the first and second tubular elongate members 4, 5 coupled by means of the alternate coupling device 1' of the present invention. The coupling and uncoupling is accomplished by means of a simple rotation of the swivel part 3a of the alternate second end piece connector 3' in the directions of the arrow 8; preferably clockwise to connect the coupling device 1', and counterclockwise to disconnect the coupling device 1'.

In this alternate embodiment, the same end piece connector 2 of the preferred embodiment is used to couple alternate end piece connector 3' thus it can be extrapolated from FIG. 3 that tapers 31, 32 serve to seal end piece connector 2 against end piece connector 3' respectively as coupling threads 29, 30 of end piece connector 2, 3' are engaged, thus forming a leak proof seal for the alternate coupling device 1' of the present invention. In practice it has been found that an elastomeric sealant like a thermalplastic liner molded into one or both of the coupling threads 29, 30 helps keep the coupling threads 29, 30 engaged.

Also in this alternate embodiment, the narrowest of IDs 13, 15 (FIG. 3) of the coupling device 1' is not narrower than the ID 14, 16 of the tubular elongate members 4, 5 themselves, thus there is no restriction of flow through the alternate coupling device 1' of the present invention.

Summary: This alternate coupling device 1' provides a releasable swiveling connector for vacuum hoses, a connector capable of withstanding the physical abuse that occurs in our daily tossing and turning of vacuum hoses.

From the above description, a number of advantages of my coupling device 1, become evident:

simple in design: As explained herein, the coupling device 1 of the present invention provides a simple and efficient design that utilizes only two parts—the first and second end piece connectors 2, 3. There's no straps, inserts, tools or accessories needed for operation, and no seals to replace.

easy to use: Since there are no straps or buckles, there is less chance of hanging up on obstacles along the path of vacuum hose like steps, curbs, and corners. And since there is less likelihood of hose separation, then there is no aggravating and tiring 'wedging,' during the job.

inexpensive: My prototype end piece connectors 2,3 were machined from rugged stock irrigation tubing (source: Superlon, Tacoma Wash.). They could also be injection molded from any of several plastics comparable to existing coupling devices presently available.

streamlined and attractive. There's no bulky straps and less girth than the couplers presently available.

Functionally:

an effective sealing mechanism: Rather than inserts or elastomeric seals, coupling threads 29, 30 are used to interlock end piece connectors 2, 3. The combination of coupling threads 29, 30 plus tapers 31, 32 provide a reliable, leak proof seal effective even when the coupling threads 29, 30 are only partially engaged as is the case in FIGS. 3 & 4. Surprisingly, the seal actually improves with exposure to the heated fluids typical of carpet cleaning solutions. The heat acts to help swell and seat the tapered seals and the vacuum helps to naturally draw the end piece connectors 2, 3 closer together. The seal thus created along tapers 31, 32 of end piece connectors 2, 3 is further protected by the fact that end piece connector 3 envelopes the tapers 31, 32 and protects them from damage under normal working conditions.

With the addition of the second end piece connector 3' I propose an even more functional device 1':

a more versatile device: Adding a swivel to the already useful releasable connector coupling device 1 is a new and useful concept. The swivel feature lets the user keep one or both flexible elongate members 4, 5 stationary while coupling or uncoupling the device 1'. This twist and swivel device 1' of the present application is useful at the intake port of any stationary and portable equipment. A user could also add this innovative device anywhere along the length of his vacuum hoses by simply replacing the second end piece connector 3 with the alternate second end piece connector 3'. The twist, seal and swivel concept has utility in various vacuum applications including short-reach applications like wall mounted vacuum cleaners, portable extractors and carwash vacuums. Longer reach applications that benefit include truck mounted carpet cleaning, whole house central-vac installations and long reach restrained vacuums.

a more user friendly design: This innovative alternate coupling device 1' adds new and unexpected benefits to the already commercially accepted twist and seal coupling device 1' of the present invention.

By adding the swivel feature at the machine or anywhere along the length of his hoses and especially at the terminal extraction device, the user has more flexibility to maneuver as he works. The user will experience less frustration since much of the hose kinking and inadvertent uncouplings is relieved at the swivel(s).

a safer design: Curious children might be tempted to pull off a standard vac hose connector 'to see what's inside' or 'hear what's inside.' It could be argued that the proposed thread-on type twist & seal type connector 1 and especially the twist and swivel type connection of present coupling device 1' is child-proof device relative to standard vac hose connector.

a more reliable engagement and better seal: The alternate coupling device 1' with the swiveling second end piece connector 3', provides a double notch & ridge design swivel engagement that stabilizes the swivel part 3a and connector part 3b, thus providing a good seal between elastomeric seal 37 and connector part 3b. There is little chance of the seal being broken or coming uncoupled inadvertently since the amount of force needed to uncouple the coupling device 1' at the coupling threads 29, 30 can be made to be significantly greater than the friction needed to cause the alternate second end piece connector 3' to swivel.

less flow restriction: As with the coupling device 1, the alternate coupling device 1' has its narrowest ID 13, 15 no less than the narrowest of IDs 14, 16 of the tubular elongate members 4, 5. Since there is no narrowing through the coupling device 1', then there is no flow restriction imposed by the coupling device 1'. Additionally, there are no projections to snag particulate as it passes through the coupling device 1'.

Operation:

User of coupling devices 1, 1' determines the correct end piece connectors 2, 3, 3' to match the chosen tubular elongate members 4, 5. In the case of carpet cleaning, vacuum hoses are typically used which have semi-rigid circumferential grooves 27, 28 along their perimeter surfaces which mate well with the end piece threads 23 of coupling device 1 and end piece threads 23, 24 of coupling device 1, 1' of the present invention. A glue or silicone sealant may be used to fixedly secure the connection between circumferential grooves 27, 28 of tubular elongate members 4, 5 to mating end piece threads 23, 24 of end piece connectors 2, 3, 3' respectively. Alternatively, end piece connectors 2, 3, 3' could be chosen which have no end piece threads 23, 24, rather, they could be sized to fit the outer diameter of the tubular elongate members 4, 5 whereby they could be fixedly glued in place.

To couple the coupling device 1 of the present invention, the user simultaneously grasps end piece connector 2 in one hand between its midpoint 25 and first end 19 and grasps end piece connector 3 in the other hand between its midpoint 26 and its first end 20 then aligns tapered surface 31 of end piece connector 2 with mating tapered surface 32 of end piece connector 3. Having thus contacted mating threads of each body, the user then simply rotates both end piece connectors 2, 3 in opposite directions relative to each other, in the case of the preferred embodiment, clockwise relative to each other as shown in FIG. 2 a minimal amount, typically about one-quarter of a revolution. Such rotation provides a simultaneous securement along the coupling threads 29, 30 of end piece connectors 2, 3 and a sealing engagement along the mating tapers 31, 32 respectively. Thus with a simple rotation, the two sections of vacuum hoses are coupled and sealed.

To couple the alternate coupling device 1' of the present invention, the user grasps end piece connector 2 in one hand between its midpoint 25 and first end 19 and grasps end piece connector 3' in the other hand at the gripper surface 38 and then aligns tapered surface 31 of end piece connector 2 with mating tapered surface 32 of end piece connector 3'. Having thus contacted mating threads of each body, the user then simply rotates gripper surface 38 clockwise relative to end piece connector 2 as shown in FIG. 8 a minimal amount, typically about one-quarter of a revolution. Such rotation provides a simultaneous securement along the coupling threads 29, 30 of end piece connectors 2, 3' and a sealing engagement along the mating tapers 31, 32 respectively. Thus with a simple rotation, the two sections of vacuum hoses are coupled and sealed.

To uncouple the coupling device 1, the user simply grasps each end piece connectors 2, 3 as described above and rotates both end piece connectors 2, 3 in opposite directions; the direction or rotation being opposite that required for securement, in the case of the preferred embodiment, approximately one-quarter of a revolution counterclockwise, thus disengaging the two end piece connectors 2, 3 of coupling device 1.

To uncouple the alternate coupling device 1', the user simply grasps each end piece connectors 2, 3' as described above and rotates both end piece connectors 2, 3' in opposite directions; the direction or rotation being opposite that required for securement, in the case of the preferred embodiment, approximately one-quarter of a revolution counterclockwise, thus disengaging the two end piece connectors 2, 3' of coupling device 1'.

CONCLUSION, RAMIFICATIONS, SCOPE

Variously sized and shaped end piece connectors 2, 3, 3' can be specifically manufactured or modified to fit various sized tubular elongate members 4, 5 in accordance with the coupling device 1, 1' of the present invention. First and second end piece connectors 2, 3, 3' may be threadably secured or the end piece threads 23, 24 may be omitted and end piece connectors 2, 3, 3' may be fixedly glued or otherwise secured to the outer surface of connection ends 6, 7 of first and second tubular elongate members 4, 5. The relative shapes, lengths, styles, thread directions, and positioning of the coupling threads 29, 30 and tapers 31, 32 may be rearranged or reversed without effecting the essence of the 'thread and taper' engagement of the coupling device 1 or the alternate coupling device 1' without changing the scope of the invention.

The preceding specific embodiments are illustrative of the practice of the invention. It is to be understood, however, that other expedients known to those skilled in the art or disclosed herein, may be employed without departing from the spirit of the invention or the scope of the appended claims.

I claim:

1. A coupling for a vacuum cleaner, the device comprising:
   a first and second end piece connectors releasably coupled to one another;
   a means fixedly connecting the first and the second end piece connectors to a pair of connection ends of first and second tubular elongated members each of the end piece connectors have end piece threads extending along the lengths of their interior surfaces from about a respective first end of each of the end piece connectors to about an axial midpoint of each of the end piece connectors, and each of said end piece threads mates with circumferential grooves along an exterior surface of each respective said tubular elongated member such that the end piece connectors may be fixedly threaded onto the tabular elongated members;
   a means of releasably coupling the first and second end piece connectors, the first end piece connector has a coupling threads located circumferentially around it exterior surface from about an axial midpoint of the first end piece connector to an axial point about three fourths of the distance from said first end of the first end piece connector the second end piece connector has a coupling this located circumferentially along its interior surface from a point about three fourths of the distance from said first end of the second end piece connector to about a second end of the second end piece connector which mates with the coupling threads of the first end piece connector, and
   a means of enabling the second end piece connector to swivel axially by bisecting wall thickness of second end piece connector along a roughly axially parallel dividing line extending from about the axial midpoint to about the axial point about three fourths of the distance from said first end of second end piece connector, the line forming two surfaces for sealing, a first surface facing outwardly and a second surface facing inwardly, one of said surfaces is modified to include one or more elongate circumferential protrusions, the opposite surface is modified to include one or more circumferential notches to receive said elongate protrusions, and one or more of the surfaces is modified to include a channel, the channel sized to retain an elastomeric seal, the resultant modifications providing a second end piece connector with an airtight freely rotating axial swivel, the swivel means made grippable by modifying the exterior surface of second end piece connector from an axial point about three fourths of the die from said first end of the second end piece connector to about a second end of the second end piece connector,
   a means of sealing the first and second end piece connector, the first end piece connector has a smooth tapered surface extending axially along its exterior surface from a point about three fourths of the distance from the first end to about a second end of the first end piece connector, the second end piece connector has a smooth tapered surface extending axially along its interior surface from about said midpoint of the second end piece to a point about three fourths of the distance from the first end and mates with said tapered surface of the first end piece connector providing a releasable sealing engagement between the tapered surface providing a leakproof connection for the tubular elongated members.

* * * * *